United States Patent [19]
Masuda et al.

[11] 3,766,014
[45] Oct. 16, 1973

[54] PRODUCTION OF ALPHA-1,6-GLUCOSIDASES
[75] Inventors: Kazuo Masuda; Kaname Sugimoto, both of Okayama, Japan
[73] Assignee: Hayashibara Company, Okayama-shi, Okayama, Japan
[22] Filed: Apr. 23, 1971
[21] Appl. No.: 137,023

[30] Foreign Application Priority Data
Apr. 25, 1970 Japan.............................. 45/35712

[52] U.S. Cl. .............................. 195/66 R, 195/65
[51] Int. Cl. ............................................ C07g 7/028
[58] Field of Search................................ 195/62, 66

[56] References Cited
UNITED STATES PATENTS
3,632,475  1/1972  Sugimoto et al. ................. 195/31 R OTHER PUBLICATIONS
Breed, et al., Betgey's Manual of Determinative Bacteriology, 7th Ed. The Williams & Wilkins Co., 1957 (pp. 344–346) QR8156C.2.

Veda, et al., Production of Isoamylase by Escherichia Intermedia, Applied Microbiology, May 1967, Vol. 15, No. 3 (pp. 492–496) QR1A6.

Primary Examiner—David M. Naff
Attorney—Browdy & Neimark

[57] ABSTRACT

The production of alpha-1,6-glucosidase by the cultivation of a strain of Klebsiella pneumoniae ATCC 13883, *Klebsiella rhinoscleromatis* ATCC 13884, *Klebsiella ozaenae* ATCC 13885, *Klebsiella edwardsii* ATCC 13886 or *Klebsiella rubiacearum* ATCC 15574 on media consisting of carbon sources, nitrogen sources, inorganic salts and others under aerating and agitating conditions thereby resulting in accumulation of alpha-1,6-glucosidase on the media and the separation of the alpha-1,6-glucosidase from the media following the purification of the alpha-1,6-glucosidase.

2 Claims, No Drawings

PRODUCTION OF ALPHA-1,6-GLUCOSIDASES

The present invention relates to a process for the production of alpha-1,6-glucosidases, comprising cultivation of strains of the genus *Klebsiella*.

Enzymes that hydrolyze specifically the alpha-1,6-glucosidic bonds of starch, glycogen, etc. were defined as isoamylases. However, since other enzymes with similar actions and capable of hydrolyzing the alpha-1,6-glucosidic bonds of pullulan were found later in *Aerobacter aerogenes* the enzymes were designated pullulanase and have been utilized in studies on polysaccharides. With the purpose of utilizing the hydrolyzation action of the enzymes in commercial production of starch hydrolyzates, the inventors screened alpha-1,6-glucosidase producing strains selected from a wide variety of type cultures and newly isolated from soils resulting in the discovery of superior strains from genera of *Esherichia*, *Pseudomonas*, *Actinomycetes*, *Lactobacillus* and others. By the evaluation of type cultures of the genus *Klebsiella*, the inventors obtained high activity enzymes from five strains.

dine reaction with the addition of a N/100 $I_2$-KI solution were recorded.

To another test tube of those cultures was added 0.2 percent SDS solution (containing 2 ml Mc Ilvaine buffer, pH 7.0, per 5 ml 0.2 percent SDS solution) autolyzed at 28°C for 30 hours in a test tube shaker, and then the enzymatic activity was determined.

Enzyme activity was determined by the following procedure. A reaction solution comprising 5 ml of 1 percent soluble glutinous rice starch, 1 ml of N/2 acetate buffer (pH 6.0), and 1 ml of said SDS autolyzate was incubated at 40°C. Prior to and 30 minutes after beginning the incubation 0.5 ml fractions of the reaction solution were collected and poured into 15 ml of N/50 $H_2SO_4$. After discontinuation of the reaction to the resulting solutions were added 0.5 ml of N/100 $I_2$-KI and developed. 15 minutes later the fractions were determined using Hitachi Model 101 spectrophotometer and a cell 1 cm wide at 610 m$\mu$. An optical density increase of 0.100 measured at the beginning of the reaction and 30 minutes later was designated 10 fu/ml.

TABLE 1

| Number | Strains | Iodine reaction | | | pH | | | O.D. at 660 m$\mu$ | | | Fu./ml. | | |
|---|---|---|---|---|---|---|---|---|---|---|---|---|---|
| | | 3 days | 5 days | 10 days | 3 days | 5 days | 10 days | 3 days | 5 days | 10 days | 3 days | 5 days | 10 days |
| 1 | *Klebsiella pneumoniae*, ATCC 13883. | Achromic. | Achromic. | Achromic. | 8.0 | 7.9 | 7.8 | 0.475 | 0.414 | 0.318 | 18.6 | 27.6 | 21.4 |
| 2 | *Klebsiella rhinoscleromatis*, ATCC 13884. | Blue | Bluish violet. | Violet | 8.6 | 8.4 | 8.5 | 0.423 | 0.398 | 0.277 | 21.0 | 22.0 | 6.6 |
| 3 | *Klebsiella ozaenae*, ATCC 13885. | do | do | Reddish violet. | 8.6 | 8.3 | 8.2 | 0.364 | 0.389 | 0.397 | 15.2 | 19.8 | 8.0 |
| 4 | *Klebsiella edwardsii*, ATCC 13886. | do | do | Achromic. | 8.7 | 8.4 | 7.8 | 0.308 | 0.320 | 0.348 | 17.2 | 18.4 | 9.8 |
| 5 | *Klebsiella rubiacearum*, ATCC 15574. | Bluish violet. | Reddish violet. | do | 8.4 | 5.4 | 7.1 | 0.227 | 1.076 | 0.571 | 23.0 | 41.6 | 25.4 |

The strains in which the inventors found enzymatic activity were

| | |
|---|---|
| *Klebsiella pneumoniae* | ATCC 13883 |
| *Klebsiella rhinoscleromatis* | ATCC 13884 |
| *Klebsiella ozaenae* | ATCC 13885 |
| *Klebsiella edwardsii* | ATCC 13886 |
| *Klebsiella rubiacearum* | ATCC 15574 |

A common culture medium comprised peptone and yeast extracts, and to which were added liquefied starch as a carbon source, potassium phosphate, dibasic magnesium sulfate and ferrous sulfate as inorganic salts. On the medium were inoculated strains grown on a bouillon agar slant, then cultivated at 28°C in test tubes under shaking conditions for 10 days. A summary of the results is given in Table 1. Each strains exhibited enzymatic activities of 15 – 25 units, thus by selecting desirable media, an acquisition of enzymes with considerable activities may be expected.

ANALYSIS

Two cultured test tubes of each strain were collected 3, 5, 7 and 10 days after beginning the cultivation. One tube of those cultures was autoclaved at 120°C for 20 minutes and its pH, optical density and iodine color (iodine reaction) were determined.

Determination of pH: analyzed with the employment of a pH meter (Hitachi-Horiba M-5 Model)

Determination of optical density: the culture broths were diluted 10 times and then the optical densities were read using a spectrophotometer (Hitachi Model 101) and a photocell 1 cm wide at 660 mu. Further, the iodine colors of the test solutions obtained by the io- To the said culture broth incubated for four days was added SDS (Sodium Lauryl Sulfate) and autolyzed for a day. Fractions of $(NH_4)_2SO_4$, 0.2 – 0.7 saturation, were collected, dialyzed against tap water, 0.02 N acetate buffer was added, and then their enzymatic activity and action on amylose or soluble glutinous rice starch were investigated.

In the specific case of *Klebsiella ozaenae*, the enzyme acts and hydrolyzes nearly 30 percent of the amylose, which suggests a possibility of co-existence of alpha-amylase in the enzyme solution. Thus the color development by iodine is extremely slight, showing a O.D. of 0.016. No co-existence of other types of amylases were noticed in the rest of the enzymes. The enzymatic actions increased iodine strains with the sole exception of *Klebsiella ozaenae* (listed No. 2 in Table 1), exhibiting their hydrolyzing capacities on alpha-1,6-glucosidic bonds.

Upon investigating the properties of such enzymes the optimal pH for an enzymatic reaction at 40°C using soluble glutinous rice starch as a substrate was found to be pH 5.5 – 6.0 by determining the increase in optical density of iodine-color. Studies on the increase of optical density of iodine color obtained from 20 hours reaction at pH 6.0 and at various temperatures showed that the optimal temperature for the enzymatic reaction was 45°– 50°C. However in the tests for *Klebsiella ozaenae* the incubation was conducted at 55°C in order to inactivate the other types of amylase activity by heating. Tests on thermal stabilities treating the enzymes for one hour in the absence of substrates showed that the enzymes were stable at 40°C, while most of the activities were inactivated at 50°C.

The substrate specificities were investigated resulting in the findings that each enzyme hydrolyzed 100 percent of waxy corn starch in the co-existence of beta-amylases and the hydrolysis rate of the enzymes on potato starch, waxy corn starch and waxy corn starch beta-limit dextrin were 90 – 100 percent. Each enzyme reacted on pullulan causing hydrolysis of 75 – 95 percent, displaying specificities identical to those of pullulanases. Strains of *Klebsiella ozaenae* were the sole enzymes which possess no hydrolysis action on glycogen, thus the strains were conceived to be an enzyme with different mechanism of action.

The enzymes derived from the above described organisms generally possess properties similar to those of pullulanases and possess considerably high activities and in addition are capable of hydrolyzing pullulan and glycogen, as well as starches. However *Klebsiella ozaenae* is the sole exception and is incapable of hydrolysis of glycogen.

The present invention will be described with illustrative of examples. The percentages and parts used hereinafter are by weight unless stated otherwise. It should be understood that no undue limitations or restrictions are to be imposed by the examples, but that the present invention is defined by the appended claims.

EXAMPLE

1. Preparation of Enzyme Solutions
The employed strains;

Five species and five strains obtained by inoculation and cultivation of lyophilized cells from ATCC (American Type Culture Collection) on nutrient bouillon agar media were employed in the examples.

| No. | Strains |
|---|---|
| 1 | Klebsiella pneumoniae (Schroeter) Trevesam ATCC 13883 |
| 2 | Klebsiella rhinoscleromatis Trevisan ATCC 13884 |
| 3 | Klebsiella ozaenae (Abel) Bergey et al. ATCC 13885 |
| 4 | Klebsiella edwardsii Cowan et al. ATCC 13886 |
| 5 | Klebsiella rubiacearum (von Farber) Centifanto and Silver ATCC 15574 |

Medium;

100 ml of the following medium composition was poured into 500 ml Erlenmeyer flasks sterilized according to the usual procedures by dry heating and autoclaved at 120°C for 20 minutes and used as medium.

| | | |
|---|---|---|
| Liquefied starch | 1 % | |
| Peptone | 1 % | |
| Yeast extracts | 0.5 % | pH 7.0 |
| $K_2HPO_4$ | 0.1 % | |
| $MgSO_4 \cdot 7H_2O$ | 0.05 % | |
| $FeSO_4 \cdot 7H_2O$ | 0.001 % | |

Culture;

The cells were transferred from the above stock culture to the same nutrient bouillon agar slants, cultivated at 30°C for 20 hours, and one loopful of the inoculum was inoculated on 100 ml of said medium. The cultivation was conducted for 4 days in a rotary shaker, 180 r.p.m., diameter 40 mm.

Preparation of enzyme solutions;

100 mg of SDS per 100 ml culture broth was added to the culture broth cultivated four days. The mixture was autolyzed at 29 C for 24 hours by said rotary shaker and salted-out, saturated to 0.9 and centrifuged (0°– 2°C, 8,000 r.p.m., 10,000 × G, for 20 minutes). The collected precipitates were dialyzed against tap water, 8°C, for two days and centrifuged (0°– 2°C, 13,500 r.p.m., 23,000 × G, for 10 minutes). Furthermore the solution removed of precipitates from the dialyzed enzyme solution was fractionated by adding $(NH_4)_2SO_4$ to 0.2 – 0.7 saturation. The precipitates of this fraction obtained by the centrifuge were dialyzed against tap water, 8°C, for 2 days, and acetate buffer was added with a final concentration of 0.02 N, and thus the solution was used as the test enzyme solution.

The results of testing these enzyme solutions for enzymatic activities and their action on soluble glutinous rice starch* or amylose** are given in the following table.

| Number | Strains | Activity of enzyme solution used | Action on amylose (incubation at 40° C. for 20 hrs.) | | Action on soluble glutinous rice starch | | |
|---|---|---|---|---|---|---|---|
| | | | Decomposition rate, percent [c] | Blue value at 680 m$\mu$ [1] | Optical density and increment in optical density | | |
| | | | | | 0 hr. | 0.5 hr. | 20 hr. |
| 1 | Klebsiella pneumoniae, ATCC 13883 | 22.5 | 2.1 | 0.639 | 0.361 (0) | 0.586 (0.225) | 0.925 (0.564) |
| 2 | Klebsiella rhinoscleromatis, ATCC 13884 | 17.5 | 1.5 | 0.318 | 0.371 (0) | 0.540 (0.169) | 0.960 (0.589) |
| 3 | Klebsiella ozaenae, ATCC 13885 | 15.0 | 27.2 | 0.016 | 0.346 (0) | 0.480 (0.134) | 0.080 (−0.266) |
| 4 | Klebsiella edwardsii, ATCC 13886 | 17.8 | 1.7 | 0.299 | 0.431 (0) | 0.509 (0.078) | 0.920 (0.489) |
| 5 | Klebsiella rubiacearum, ATCC 15574 | 11.0 | 1.6 | 0.241 | 0.364 (0) | 0.474 (0.110) | 0.740 (0.376) |
| Control | Aerobacter aerogenes, ATCC 9621 [b] | 1.7 / 7.0 | 3.1 | 0.35 | 0.360 (0) / 0.362 (0) | 0.347 (0.014) / 0.432 (0.070) | 0.685 (0.325) / 0.849 (0.487) |

NOTE:
[1] Reaction 0 hr., 1.310.
[b] Enzyme solutions fractionated by saturation to 0.2–0.7 with $(NH_4)_2SO_4$ were used.
[c] In the table the error of each hydrolysis rate is expressed percent values (given in the table) ±0.2–0.5%.

* The action on soluble glutinous rice starch was determined by the following procedure. A mixture comprising 0.5 ml 1 percent soluble glutinous rice starch, 0.1 ml 1 percent N/2 acetate buffer (pH 6.0), and 0.1 ml of said enzyme solution was reacted at 40°C for 20 hours, and fractions of 0.1 ml each were collected at 0, 0.5 and 20 hours. Incubation was discontinued with an addition of 3 ml of N/50 $H_2SO_4$, and developed with 0.1 ml of N/100 $I_2$-KI solution. 15 minutes later the optical densities were determined at 610 m$\mu$ with 1 cm cells. The optical densities of color developed solutions obtained by diluting the 20 hours reaction solutions were measured comparing a color developing agent (comprising 0.10 ml 20 hours reaction solution, 17.07 ml N/50 $H_2SO_4$ and 0.72 ml 0.2 $I_2$-2 percent KI solution) with those of control (comprising 0.10 ml pure water, 17.07 ml N/50 $H_2SO_4$ and 0.72 ml 0.2 $I_2$-2 percent KI solution) prepared individually for each test solution immediately before the determination using 1 cm cells and a spectrophotometer. Hitachi Model 124 at 380−800 m$\mu$. The color developing agent employed was the one according to E. J. Bourne, W. N. Haworth, A. Macey and S. Peat, (J. Chem. Soc. 1948, 924) and with a concentration of four times.
** The action on amylose was determined with the employment of 0.4 percent amylose (an amylose solution dissolved with N-NaOH, and neutralized with N-HCl, a product manufactured and distributed by Nagase Sangyo Kabushiki Kaisha). A mixture comprising 2 ml of 0.4 percent of the test solutions (each contains 0.02 N acetate buffer, pH 6.0) was incubated at 40°C for 20 hours. The amounts of direct reducing sugars and total sugars were analyzed quantitatively by the Somogyi-Nelson method and the Anthrone method. The increase obtained 20 hours after the commencement of the reaction was expressed by multiplying 100 to the hydrolysis rate calculated direct reducing sugars (as glucose) vs. total sugars.

2. The Properties of the Enzyme

Using said solutions, the effects of pH and temperatures on the reaction rate and thermal stabilities were determined. The optimal pH, optimal temperatures and thermal stabilities were investigated. The results of the investigation are listed in the following table.

| No. | Strains | Optimal pH* | Optimal** temperature, °C | Thermal stability*** (residual activity) percent | | | |
|---|---|---|---|---|---|---|---|
| | | | | 4° C. | 30° C. | 40° C. | 50° C. |
| 1 | Klebsiella pneumoniae, ATCC 13883 | 5.5 | 50 | 100 | 100 | 90 | 0 |
| 2 | Klebsiella rhinoscleromatis, ATCC 13884 | 6.0 | 50 | 100 | 100 | 92 | 0 |
| 3 | Klebsiella ozaenae, ATCC 13885 | 6.0 | 50 | 100 | 100 | 100 | 0 |
| 4 | Klebsiella edwardsii, ATCC 13886 | 6.0 | 45 | 100 | 100 | 94 | 0 |
| 5 | Klebsiella rubiacearum, ATCC 15574 | 6.0 | 45 | 100 | 100 | 100 | 0 |
| Control | Aerobacter aerogenes, ATCC 9621 | 6.0 | 50 | 100 | 100 | 95 | 2 |

NOTE

* The optimal pH was determined according to the above described method for the determination of iodine activities using M/2 acetate buffers of pH 5.5 and 6.0 and M/5 phosphate buffers of pH 6.0, 6.5 and 7.0 as buffers and said enzyme solutions, reacting the mixture at 40°C**** and determining the increases of optical densities at 0.5 and 20 hours to those at 0 hour.

** The optimal temperatures were also determined according to the method for iodine activities, reacting the mixtures at pH 6.0 and at temperatures of 30°C, 40°C, 50°C, 55°C and 60°C and determining the increases of optical densities at 0.5 and 20 hours to those at 0 hour.

*** The thermal stabilities were determined by the following procedure. After treating said enzyme solutions, to which 0.02 N acetate buffer was added, for one hour at 4°C, 30°C, 40°C, 45°C, 50°C, 55°C and 60°C, the residual activities were determined, according to the iodine activity measurement method.

**** In only the case of Klebsiella ozaenae the incubation was effected at 55°C.

Substrate specificity;

0.5 ml of 1 percent substrate solution of a member of the group comprising potato starch, waxy corn starch, waxy corn starch beta-limit dextrin, oyster glycogen and pullulan, 0.1 ml of N/2 acetate buffer (pH 6.0), 0.1 ml of beta-amylase (5u/ml)* and 0.1 mol of said enzyme solution (4 fu/ml) or pure water were incubated at 40°C* for 24 hours, then the incubation was discontinued by treating the mixture at 100°C for 15 minutes, and analyzed quantitatively.

NOTE

* A beta-amylase extracted from wheat bran, treated with an acid, fractionated with ammonium sulfate and dialyzed, was used in the investigation. (No variation was noticed on the iodine color of reaction mixture when mixture of said beta-amylase solution and potato beta-limit dextrin was incubated for three days.) Enzyme activity of said beta-amylase was determined by the following procedure.

A reaction solution comprising 5 ml of 1 percent soluble starch, 4 ml of M/10 acetate buffer (pH 5.0), 1 ml of enzyme solution was incubated at 40°C. After discontinuation of the reaction, direct reducing sugars produced under the above conditions were quantitatively analyzed by Fehling-Lehmann-Schoorl's method. An increase of 10 mg of direct reducing sugars (as maltose) after incubation at 40°C for 30 minutes was designated 1 u/ml.

In the case pullulan was used as substrate beta-amylase was replaced with pure water. 10 u/ml of betaamylase solution was used in the case of Klebsiella ozaenae ATCC 13885.

** In the case of Klebsiella ozaenae ATCC 13885 8fu/ml of enzyme solution was used.

*** In only the case of Klebsiella ozaenae ATCC 13885 the incubation was effected at 55°C.

**** Direct reducing sugars were determined by Somogyi-Nelson's method, while total sugars by the Anthrone method. The rates of hydrolysis were expressed in the case pullulan was used as substrate as maltotriose/total sugars × 100 (percent), whereas for the other substrates as maltose/total sugars × 100 (percent).

The results are given in the following table.

| | | Enzyme | | | | |
|---|---|---|---|---|---|---|
| Number | Substrate | β-amylase | β-amylase plus Klebsiella pneumoniae, ATCC 13883 | β-amylase plus Klebsiella rhinoscleromatis, ATCC 13884 | β-amylase plus klebsiella ozaenae, ATCC 13885 | β-amylase plus Klebsiella edwardsii, ATCC 13886 | β-amylase plus Klebsiella rubiacearum, ATCC 15574 |
| 1 | Potato starch, percent | 64 | 96 | 96 | 107 | 89 | 78 |
| 2 | Waxy corn starch, percent | 67 | 101 | 101 | 106 | 101 | 91 |
| 3 | Waxy corn starch β-limit dextrin, percent | 0 | 89 | 94 | 93 | 89 | 81 |
| 4 | Oyster glycogen, percent | 41 | 72 | 75 | 49 | 67 | 98 |
| 5 | Pullulan, percent | 0 | 74 | 92 | 82 | 94 | 77 |

In the next table are given the results** obtained by incubating a mixture comprising 0.5 ml 1 percent substrate solution used in the above investigation on substrate specificity, 0.1 ml N/2 acetate buffer (pH 6.0) and 0.1 ml enzyme solution (4 fu/ml) at 40°C for 20 hours.

| | | Enzyme | | | | |
|---|---|---|---|---|---|---|
| Number | Substrate | Klebsiella pneumoniae, ATCC 13883 | Klebsiella rhinoscleromatis, ATCC 13884 | Klebsiella ozaenae, ATCC 13885 | Klebsiella edwardsii, ATCC 13886 | Klebsiella rubiacerum, ATCC 15574 |
| | | Hydrolysis Rate (as glucose) percent | | | | |
| 1 | Potato starch | 0 | 2 | 12 | 3 | 11 |
| 2 | Waxy corn starch | 2 | 2 | 14 | 4 | 7 |
| 3 | Waxy corn starch limit dextrin | 7 | 9 | 21 | 11 | 14 |
| 4 | Oyster glycogen | 1 | 1 | 10 | 2 | 2 |
| 5 | Pullulan | 26 | 32 | 29 | 33 | 27 |

NOTE

* Each substrate was incubated solely with the above enzyme solutions from the strains of the genus Klebsiella.

** Direct reducing sugars were quantitatively determined by Somogyi-Nelson's method while total sugars by the Anthrone method. The hydrolysis rates were expressed as total reducing sugars (as glucose)/total sugars × 100 (percent).

The error of each hydrolysis rate is in % value (give in the table) ± 2 percent.

What we claim:

1. A process for the production of alpha-1,6-glucosidases, comprising cultivation of strains selected from the group consisting of Klebsiella rhinoscleromatis ATCC 13884, Klebsiella ozaenae ATCC 13885, Klebsiella edwardsii ATCC 13886 and Klebsiella rubiacearum ATCC 15574 on media consisting essentially of carbon sources, nitrogen sources, inorganic salts under aerating and agitating conditions, accumulation of alpha-1,6-glucosidases on the media, separation of said glucosidases from the media and purification of said glucosidases.

2. A process according to Claim 1 wherein the alpha-1,6-glucosidase is separated from the culture medium by salting out the culture broth against ammonium sulfate (0.2 – 0.7 saturation) after conducting autolyzation of the culture medium.

* * * * *